Inventor
Donald L. Blachly

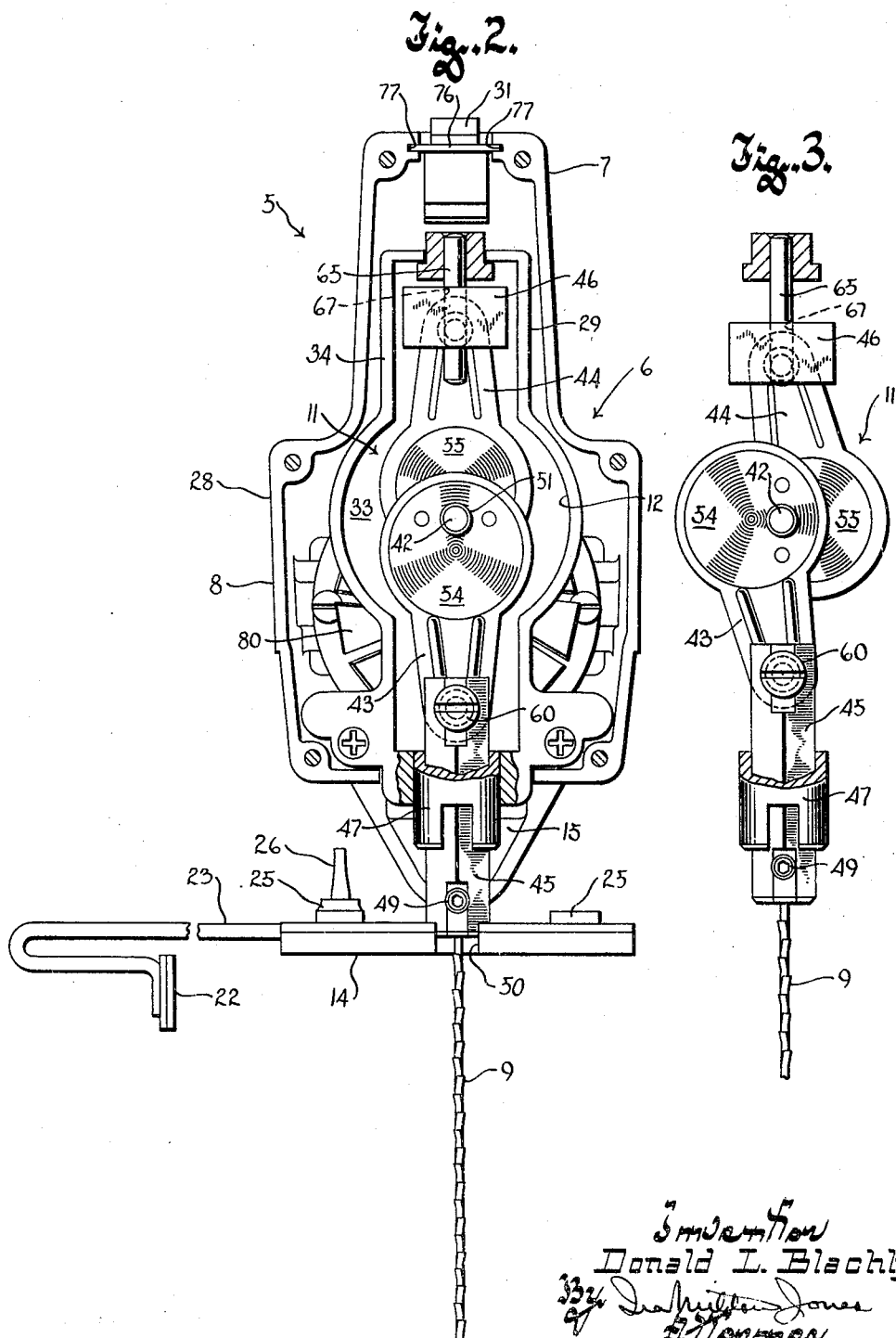

United States Patent Office 2,949,944
Patented Aug. 23, 1960

2,949,944

PORTABLE HAND HELD SAW

Donald L. Blachly, Milwaukee, Wis., assignor to John Oster Manufacturing Co., Milwaukee, Wis., a corporation of Wisconsin Filed June 27, 1958, Ser. No. 745,087

5 Claims. (Cl. 143—68)

This invention relates to portable hand held saws and refers more particularly to so-called sabre saws, of the type wherein an elongated blade projects downwardly from the body of the machine, with its lower end unsupported, and the blade is lengthwise reciprocated by by power means housed in the body of the tool.

It is a general object of this invention to provide a sabre saw which is simple and inexpensive to produce and which, in particular, is easy to assemble from a relatively few parts all of which may be produced by inexpensive manufacturing methods.

A more specific object of this invention resides in the provision of a sabre saw having an electric motor by which the saw is powered, and transmission means by which rotation of the motor is translated into reciprocation of the saw blade, said motor and transmission means being enclosed in a housing comprising only three main members, all easily fabricated by die casting and which cooperate to define separate motor and transmission compartments.

It is also a specific object of this invention to provide a sabre saw having a housing with a readily removable front wall which closes a transmission compartment in the housing and removal of which affords complete access to all of the eccentric transmission means and to a counterweight by which the inertia forces of the reciprocating saw blade carrier are counterbalanced.

In this connection it is also an object of this invention to provide a sabre saw which will be low in first cost, by reason of the ease with which its parts can be manufactured and assembled, and which is also easy and inexpensive to maintain because of the facility with which it can be disassembled and reassembled.

It is another object of this invention to provide a sabre saw wherein all of the moving parts that require lubrication are located in a chamber at the front of the housing comprising the saw body, which chamber is isolated from the motor but is nevertheless readily accessible upon removal of a single wall member which defines the front of the housing.

Another object of this invention resides in the provision of a sabre saw having a blade which is slightly tilted or inclined along its length, at an acute angle to its path of reciprocation, so as to provide improved cutting action.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is a cross-sectional view taken on the plane of the line 2—2 in Figure 1, showing the saw blade carrier at the bottom of its stroke; and Figure 3 is a front view of the transmission mechanism in the position at which the saw blade is substantially midway in its stroke.

Figure 1:
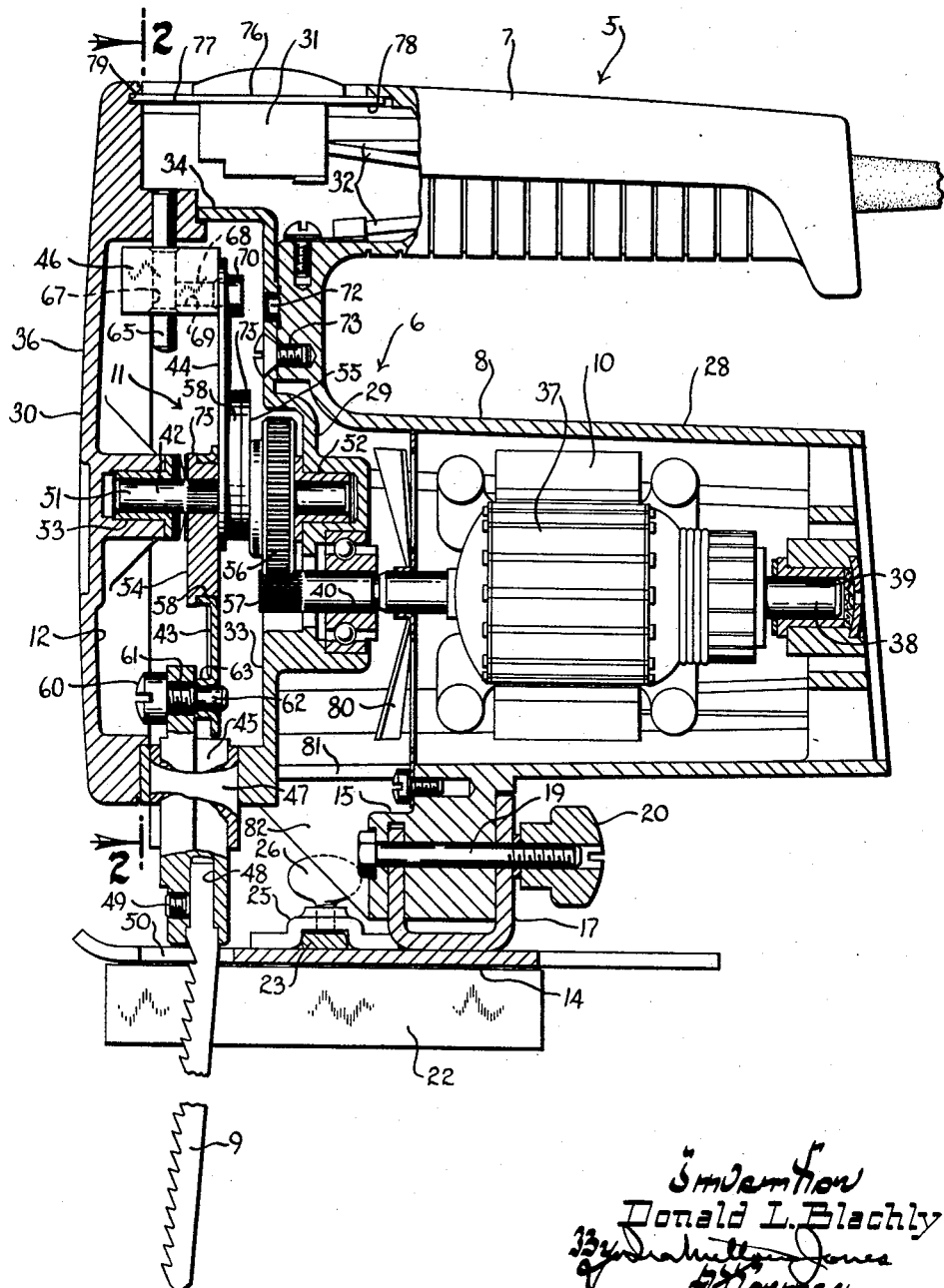
Figure 1 is a view of the sabre saw of this invention taken substantially in vertical section along tis longitudinal center line.

Referring now more particularly to the accompanying drawings, the numeral 5 designates generally a hand held portable cutting tool of the type known as a sabre saw and comprising generally a housing 6 defining a handle portion 7 and a body portion 8. An elongated saw blade 9 projects downwardly from the body of the device and is adapted to be lengthwise reciprocated by means of an electric motor 10 enclosed in the body portion of the housing and which drives the blade through a transmission, designated generally by 11, housed in a transmission compartment 12 in the front of the housing.

The saw blade projects downwardly through a guide table 14 beneath the body, which is adapted to ride on the upper surface of a piece of work being cut by the saw, and by which the blade is held at the desired angle to the work. At the bottom of the body portion of the housing is a lug-like block 15, embraced by a U-shaped bracket 17 secured to the upper surface of the table and cooperating therewith to provide a mounting for the guide table. A securement screw 19 extends fore and aft through the bracket and the block to permit the bracket to pivot about the screw and thus enable the table to be tilted at any desired oblique angle relative to the blade. A tightening nut 20 is threaded onto one end of the screw 19 (which is confined against rotation) so that the bracket may be clampingly engaged against the block to thus frictionally retain the table in any desired position of tilting motion about the axis of the screw 19.

A fence 22 mounted alongside of the table is cooperable with an edge of the work piece being cut, to guide the saw, and is adjustable laterally toward and from the blade. The fence has a laterally extending arm 23 engaged under a pair of channel-shaped brackets 25 on the top of the table, and a thumb screw 26, threaded into the top of one of the brackets, clampingly confines the arm against the upper surface of the table to hold the arm in any desired position of lateral adjustment of the fence.

Considered more specifically, the housing consists of rear, intermediate and front members 28, 29 and 30, each of which is readily adaptable to production by die casting. The largest housing member 28, forming the rear of the housing, provides the motor compartment 8 and the handle 7, and includes the table mounting block 15. The handle portion of the rear housing member is hollow so as to accommodate a switch 31 by which the motor may be controlled, together with the necessary conductors 32 by which electric power from a source thereof may be brought to the motor. The handle portion opens to the front of the body, as does the motor compartment, which of course encloses the motor 10.

The intermediate housing member 29 comprises an upright wall 33 which (as best seen in Figure 2) partially closes the front of the motor compartment, and a peripheral side wall 34 projecting forwardly from the upright wall and cooperating therewith to define the transmission compartment 12, which extends above the motor compartment a substantial distance. The third housing member 30 comprises a front wall 36 for the housing, which closes the front of the motor compartment and of the transmission compartment, as well as closing the front of the handle portion of the housing.

The motor compartment is substantially cup-shaped, opening forwardly. The armature 37 of the motor 10 has its shaft 38 extending fore and aft, with the rear end portion of the shaft journaled in a bearing 39 fixed at the rear of the motor compartment and its front end portion projecting through the upright wall 33 of the intermediate member and journaled in a bearing 40 mounted in said wall.

The transmission 11, all of which is enclosed in the transmission compartment and is conjointly supported by the intermediate housing member 29 and front housing member 30, comprises in general, a crankshaft 42 and a pair of pitmans 43 and 44 which respectively connect the crankshaft with a blade carrier 45 and a counterweight 46.

The blade carrier can be made of a single elongated piece of metal having a non-circular cross-section, lengthwise slidably mounted in a bearing 47 at the bottom of the transmission compartment, fixed in the forwardly projecting wall portion 34. The blade carrier has a downwardly opening well 48 at its bottom, forming a socket in which the upper end portion of the saw blade 9 is adapted to be received, and a set screw 49 threaded into a transverse bore in the lower portion of the blade carrier is engageable with the blade to hold it in the socket. The blade projects downwardly from the blade carrier through a slot 50 in the table.

The blade has the cutting edges of its teeth uppermost, so as to cut on the upward stroke and enable the table to hold the work piece against movement with the blade. It is a feature of the sabre saw of this invention that the blade is slightly inclined or tilted along its length, with its lower end forwardly (in the direction of cutting advance) of its upper end. With the blade thus disposed at a small acute angle to its path of cutting reciprocation, all of the teeth must cut at the start of each stroke, and each tooth, as it moves upwardly in its cutting stroke, must bite into fresh material untouched by the teeth above it. On the downward stroke of the blade its tilted inclination provides for chip clearance. An angle of about 3° to the path of blade motion has been found to be very desirable for the blade's inclination.

The crankshaft 42 comprises a straight shaft 51 having its rear end journaled in a bearing 52 carried by the upright wall member 33 and its front end journaled in a bearing 53 in the front housing member. The medial portion of the crankshaft is splined, and on it are mounted a pair of axially adjacent eccentrics 54 and 55 and a driven gear 56. The front end portion of the motor shaft, which projects into the transmission compartment, comprises a pinion 57 that is meshingly engaged with the driven gear 56 on the crankshaft.

The two eccentrics 54 and 55 are circular but are mounted on the crankshaft off-center, with their circular axes at diametrically opposite sides of the shaft. Each of the pitmans has a large bored boss 58 at one end thereof in which one of the eccentrics is journaled, and because of the opposite displacement of the eccentrics the pitmans are of course moved in opposite directions as the crankshaft rotates.

The connection between the lower pitman 43 and the blade carrier is provided by a pintle 60 having a threaded front end portion 61 engaged in the upper portion of the blade carrier and having a plain rear end portion 62 projecting rearwardly from the blade carrier and engaged in a bored boss 63 on the lower end portion of the pitman.

The counterweight 46 is a block having a mass substantially equal to that of the blade and blade carrier, mounted for up and down reciprocation on a guide pin 65 fixed to the upper portion of the front housing member 30 and projecting downwardly therefrom. A vertical bore 67 in the counterweight block provides a sliding bearing for the guide pin 65, and a wrist pin 68, press fitted in a rearwardly opening transverse bore 69 in said block and projecting rearwardly therefrom, is engaged in a bored boss 70 on the top of the upper pitman to provide a rocking connection between said pitman and the counterweight. It will be observed that the structure of this invention provides not only for counterbalancing the up and down forces due to saw blade reciprocation, but also balances out the horizontal force components generated by the several moving parts of the mechanism.

In assembling the power tool of this invention the motor armature 37 is placed in the motor compartment, seating the rear end of its shaft in the rear bearing 39, and then the intermediate housing member 29, with the front motor shaft bearing 40 in place thereon, is fastened on the front of the rear housing member 28. It will be observed that the pinion 57 on the front of the motor shaft has a diameter no greater than that of the journal portion of the shaft directly behind it, so that the pinion can pass freely through the bearing 40 as the intermediate housing member 29 is set in place. Locating pins 72, fixed on one of the two housing members 28 and 29 and engageable in mating bores in the other, can be employed to assure that the motor shaft bearings 39 and 40 will be in coaxial alignment, and screws 73, engaged in threaded wells opening to the front face of the rear housing member 28, may be used to secure said two housing members together.

Next, the gear 56 is assembled onto the crankshaft, as are the two eccentrics with the pitmans in place on them. The pitmans must be on the eccentrics when the latter are pushed onto the crankshaft because each eccentric has a circumferential radially projecting flange 75 adjacent to the face thereof which is axially remote from the other eccentric, and the two pitmans are confined between these flanges when the latter are in place on the crankshaft. The crankshaft, with the pitmans assembled thereto, is engaged in the bearing 52, with the driven gear in mesh with the pinion 57. The saw blade carrier is inserted into its bearing 47 and the pintle 60 is screwed into the blade carrier, engaging the rearwardly projecting pin portion of the pintle in the bored boss in the lower pitman.

To complete the assembly of the transmission mechanism, the front housing member is then secured to the intermediate housing member, with the counterweight block in place on the pin 65. The pin 68 is preferably press fitted into the counterweight block and must of course be engaged in the bored boss in the upper pitman as the front housing member is set in place. Because the transmission compartment is completely enclosed, and thus isolated from the motor, it may be packed with grease without danger that the grease will get into the motor compartment.

The switch 31 is mounted on a rectangular plate 76, the longitudinal edge portions of which are received in opposite grooves 77 in the handle portion of the rear housing member. Dimples 78 in the plate are compressively engaged by the edges of the grooves 77 to confine the plate against rattling, and the front housing member 30 has a rearwardly opening groove 79 therein, aligned with the grooves in the handle portion, in which the front end of the plate is engaged to prevent endwise displacement of it.

Behind the upright wall portion 33 of the intermediate housing member the motor shaft has a fan 80 mounted thereon to draw air through the apertured rear of the housing compartment and across the motor to cool the same. This cooling air is expelled from the housing through an opening 81 in the bottom of the motor compartment portion of the housing, just ahead of the fan, and it passes between a pair of ribs 82 which extend forwardly from the front of the table mounting block 15 up to the bottom of the housing. These ribs guide the cooling air to the work zone, where it blows away sawdust from around the blade.

From the foregoing description taken together with the accompanying drawings it will be apparent that this invention provides a sabre saw having unusual simplicity and low cost by reason of the fact that it comprises relatively few parts, all of which may be produced by high production methods and may be very easily assembled. It will also be apparent that the sabre saw of this invention has all of the moving parts of its transmission, by which rotary motion of the motor is translated into reciprocating motion of the saw blade carrier and counterweight, located in a separate compartment which is isolated from the motor.

What is claimed as my invention is:

1. A hand held power driven saw of the type wherein a saw blade is rapidly reciprocated by means of a rotary electric motor drivingly connected with the saw blade through transmission mechanism which converts the rotary motion of the motor into reciprocation, said saw being characterized by: means defining a closed transmission housing having spaced front, rear and side walls and top and bottom walls; a blade carrier adapted to have a saw blade fastened thereto; bearing means in the bottom wall of the transmission housing having the blade carrier received therein and constraining the same to vertical reciprocation; a counterweight in the upper portion of the transmission housing; vertically extending guide means fixed in the upper portion of the transmission housing, and upon which the counterweight rides; coaxial bearings in the front and rear walls of the housing, the common axis of which is normal to the path of reciprocatory motion of the blade carrier and counterweight and located substantially medially thereof; a crankshaft journalled in said bearings; a pair of axially adjacent oppositely displaced eccentrics on the shaft spaced from said front and rear walls; a pitman journalled on each of said eccentrics; peripheral flanges on the remote faces of said two eccentrics holding the pitmans against axial separation and in defined axial positions on the eccentrics with one pitman projecting downward from its respective eccentric and the other projecting upward; a pivotal connection between the downwardly projecting pitman and the blade carrier; a pivotal connection between the upwardly projecting pitman and the counterweight; and means drivingly connecting the crankshaft with the motor.

2. The structure of claim 1, further characterized by the fact that said flanged eccentrics are press-fitted onto the crankshaft; and by the fact that the driving connection between the crankshaft and the motor comprises a gear also press-fitted onto the crankshaft and interposed between the rear wall of the transmission housing and the adjacent flanged eccentric, and a pinion meshing with the gear and driven by the motor.

3. The structure of claim 2, further characterized by the provision of housing means for the motor; a rear motor shaft bearing carried by said motor housing means; a front motor shaft bearing in the rear wall of the transmission housing; the front end portion of the motor shaft having the pinion directly thereon, the pinion being of a diameter no greater than the inside diameter of said front motor shaft bearing so that it may be passed through the front bearing during assembly; the motor shaft having its rear end portion journalled in the rear motor shaft bearing and its front end portion journalled in the front motor shaft bearing with the pinion inside the transmission housing and meshing with the gear, upon assembly of the transmission housing with said housing means; and means detachably securing the transmission housing to said housing means with the front and rear motor shaft bearings in coaxial alignment.

4. The structure of claim 1 further characterized by the fact that the blade carrier and the bearing means in which it reciprocates are of complementary polygonal cross section to securely hold the blade carrier against rotation without interfering with reciprocation thereof; and means for securing a saw blade to the blade carrier including a slot rectangular in cross section extending up into the blade carrier from its bottom to receive the attaching end portion of a saw blade, and means on the blade carrier to detachably secure the attaching end portion of a saw blade in said slot.

5. The structure of claim 1, further characterized by the fact that the guide means for the counterweight comprises a round pin fixed in the top wall of the transmission housing and projecting downwardly therefrom; and by the fact that the counterweight comprises a block having a bore slidably receiving said pin.

References Cited in the file of this patent

UNITED STATES PATENTS

| | | |
|---|---|---|
| 1,648,008 | Selby et al. | Nov. 8, 1927 |
| 2,138,862 | Johnston | Dec. 6, 1938 |
| 2,501,631 | Oschwald | Mar. 21, 1950 |
| 2,639,737 | Forsberg | May 26, 1953 |
| 2,746,493 | Babcock | May 22, 1956 |
| 2,808,082 | Moretti et al. | Oct. 1 1957 |